United States Patent [19]

Cook

[11] 4,355,398
[45] Oct. 19, 1982

[54] REAL TIME CLOCK RECOVERY CIRCUIT

[75] Inventor: Donald M. Cook, Poway, Calif.

[73] Assignee: NCR Corporation, Dayton, Ohio

[21] Appl. No.: 217,339

[22] Filed: Dec. 17, 1980

[51] Int. Cl.$^3$ .............................................. H04L 7/02
[52] U.S. Cl. .................................... 375/110; 307/511; 328/155; 375/118
[58] Field of Search .................... 375/82, 87, 106, 110, 375/111, 118; 360/40, 42, 43; 307/510, 511, 512; 328/72, 108, 109, 201, 155; 370/100; 329/107, 126; 340/825.2

[56] References Cited

U.S. PATENT DOCUMENTS

| | | | |
|---|---|---|---|
| 3,235,855 | 2/1966 | Woo | 375/110 |
| 3,271,750 | 9/1966 | Palidino | 360/42 |
| 4,185,273 | 1/1980 | Gowan | 375/87 |
| 4,313,206 | 1/1982 | Woodward | 375/110 |
| 4,320,525 | 3/1982 | Woodward | 375/110 |

Primary Examiner—Benedict V. Safourek
Attorney, Agent, or Firm—J. T. Cavender; Edward Dugas; Arthur A. Sapelli

[57] ABSTRACT

This invention relates to a real time clock recovery circuit. The clock recovery circuit requires three inputs, a bit serial data received input (BSD), a quarter bit delayed (QBT) and a three quarter bit delayed (TQBT) signal. The three inputs are derived from a single raw input that becomes the received input (BSD) signal. QBT and TQBT are delay line versions of the BSD signal. The three inputs (BSD, QBT and TQBT, and the complement of these signals) are ANDed together to detect low frequencies. The generated signal indicative of the low frequency, QBT and TQBT generate a recovered clock by state sequencing of an R-S latch. The type of bit serial data stream which may be inputted to the circuit of the present invention is double frequency encoded data streams, including Manchester or diphase encoded.

14 Claims, 4 Drawing Figures

REAL TIME CLOCK RECOVERY CIRCUIT

BACKGROUND OF THE INVENTION

This invention relates to digital data transmission systems and more particularly, to a circuit for deriving timing signals from a serial digital data stream and a method therefor whereby the timing signals may be subsequently utilized by a receiver to decode and deserialize the received data stream.

In transmitting serial digital data, it is necessary to provide a series of clock pulses in addition to the data pulses in order to synchronize the coding of the transmitted serial digital data at a receiving terminal or the receiver. In prior-known transmitting schemes, two transmission lines or paths, or two channels were required for this purpose, one for the data signal and one for the clocking signal. In attempting to avoid the requirement for a dual transmission path (or two channels), self-clocking codes evolved as a result of combining the clock and data signals. The Manchester code is one such self-clocking code. Manchester encoders accept clock and data and combine them into a single output which may be transmitted by a single transmission line to the receiving terminal. When the self-clocking data (i.e., the serial digital data stream) arrives at the receiving terminal, it is processed by a decoder which extracts separately both data and clock from the input self-clocking code.

The clock recovery circuits of the prior art generally are formed by directing the serial digital data stream into AND or NAND gates causing a clock output, and when the conditions for setting disappear, the output resets. The circuit of the present invention requires a specific condition, or set of conditions, to set a latch and another condition, or set of conditions, to reset the latch yielding a symmetrical recovered clock. As a result of utilizing a latch requiring specific set conditions and specific reset conditions, there is provided by the circuit of the current invention a high-speed real time clock recovery circuit. In addition, the circuit of the current invention provides a significant desensitivity to delay line tap to tap variations and further yields a recovered clock symmetry that is less sensitive to the bit skew of the raw input serial digital data stream. Further, the circuit of the current invention generates a signal indicative of when a low frequency has occurred in the serial digital data stream, which signal is subsequently utilized in a data recovery circuit for Manchester code or diphase code.

SUMMARY OF THE INVENTION

Therefore, there is provided in the present invention, a clock recovery circuit having an input terminal adapted to receive a raw serial data stream having a defined bit time, the raw serial data stream being the resultant combination of a data signal and a clock signal. The clock recovery circuit comprises a signal generator which includes logic for shifting the raw serial data stream by one-quarter bit time thereby providing a second input signal. There is also included in the signal generator, logic for shifting the raw serial data stream by three-quarters of a bit time thereby providing a third input signal. Detecting logic is included for detecting transitions in the second input signal or the third input signal to provide an output signal having a transition occurring at each of the detected transitions, the output signal being the clock signal recovered from the raw serial data stream.

The detecting logic includes a latch having an output terminal for providing the output signal. A first signal is generated which indicates whether a low frequency of the input signal has occurred during the bit time just about to expire. The detecting logic further includes a plurality of NOR-gates for triggering the latch. The plurality of NOR-gates generates a trigger signal upon detection of a transition in the second input signal or in the third input signal, thereby causing a transition in the output signal of said latch, the output signal being the clock signal.

A method for recovering the clock signal comprises the steps of deriving a shaped serial data stream from a raw serial data stream thereby providing a first input signal. Then the first input signal is shifted by one-quarter bit time thereby providing a second input signal. The first input signal is also shifted by three-quarters of a bit time thereby providing a third input signal. Transitions are then detected in the second input signal or the third input signal to provide an output signal having a transition occurring at each of the detected transitions, the output signal being the clock signal recovered from the raw serial data stream.

From the foregoing, it can be seen that it is a primary object of the present invention to provide a novel clock recovery circuit.

It is another object of the present invention to provide a novel clock recovery circuit utilizing an input serial digital data stream being of the double frequency encoded data type.

It is yet another object of the present invention to provide a clock recovery circuit that is less sensitive to bit skewing of the raw input serial digital data stream.

It is still another object of the present invention to provide a clock recovery circuit which is insensitive to relatively high amounts of bit distortion.

It is still a further object of the present invention to provide a clock recovery circuit which provides a very fast clock recovery resolution for any technology.

It is still a further object of the present invention to provide a clock recovery circuit which provides a recovered clock signal which is highly symmetrical.

These and other objects of the present invention will become more apparent when taken in conjunction with the following description, and attached drawings, wherein like characters indicate like parts and which drawings form a part of the present application.

DETAILED DESCRIPTION

Figure 1:
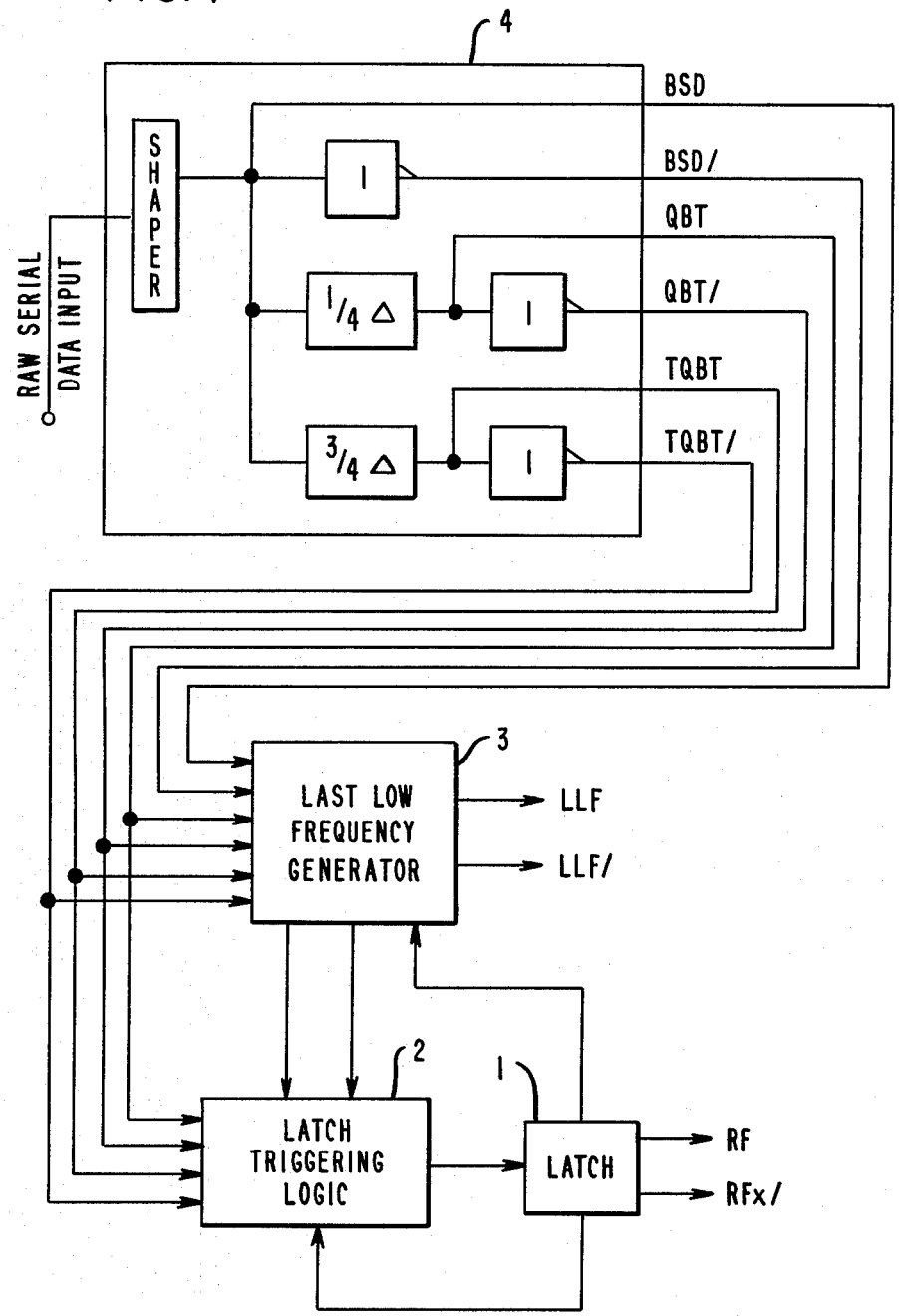
FIG. 1 is a block diagram of the clock recovery circuit of the present invention.

The clock recovery circuit of the present invention is shown in block diagram form in FIG. 1. The clock signal (RF) is recovered from a serial digital data stream as the output of a latch 1.

Within a receiving terminal there is included within the clock recovery circuit of the present invention, a signal generator 4 which generates three digital signals and their respective complement (or bar) signals, these digital signals being derived from a raw serial data input signal which combines the data and clock signals. The digital signals comprise the bit serial data signal (BSD) which is a demodulated, shaped, version of the raw serial data input signal using regeneration techniques well known in the art, the quarter bit time signal (QBT) which is a version of BSD delayed by a quarter of a bit time, the three-quarter bit time signal (TQBT) which is a version of BSD delayed by three-quarters of a bit time, and the respective complement or inverted signals $\overline{BSD}$, $\overline{QBT}$, and $\overline{TQBT}$ (the inverted signals also denoted herein by a slash following the signal designation, e.g. BSD/, QBT/, and TQBT/). Techniques for generating the digital signals and the respective complement signals are well known in the art; hence, the signal generator 4 will not be discussed further herein. In order to achieve the high speed of operation (i.e., data rates in the order of 24 MHz. which, due to the double frequency encoding, can result in pulse widths in the order of 15 ns), the respective complement signals must be symmetrical in time in order to avoid glitches in the clock. That is, when the $\overline{QBT}$ signal starts going high, QBT starts going low within approximately 1 ns, i.e. less than one gate delay. The same symmetry also applies in the opposite direction for the $\overline{QBT}$ signal, and also for the $\overline{TQBT}$ signal. The digital signals BSD, $\overline{BSD}$, QBT, $\overline{QBT}$, TQBT, and $\overline{TQBT}$ are inputted to a last low frequency (LLF) generator 3, together with the complement of the recovered clock signal RFx/. The output of LLF generator 3 is the last low frequency (LLF) signal and its complement signal $\overline{LLF}$. The LLF signal indicates, by a change of state, when a low frequency of the BSD signal has occurred within a bit time. The operation of LLF generator 3 will be described in further detail hereinunder. The LLF signal is also applicable for and facilitates the decoding of, an inputted serial digital data stream coded in either Manchester code or diphase code. In such an application, the LLF signal can then be transmitted to the data recovery circuits (not shown) within the receiving subsystem in order to recover the data. The latch 1 is set or reset by the output of latch triggering logic 2. Digital signals QBT, $\overline{QBT}$, TQBT, and $\overline{TQBT}$ are combined by latch triggering logic 2 with the LLF and $\overline{LLF}$ signals, and the complement of the recovered clock RFx/, for generating the set and reset signals of latch 1. The operation of the latch triggering logic 2 will be explained in detail hereinunder.

Figure 2:
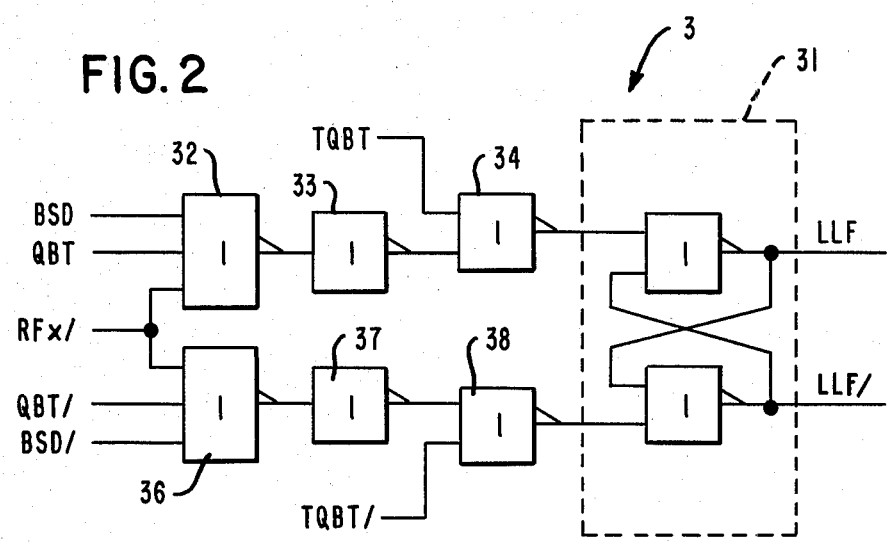
FIG. 2 is a logic diagram of the preferred embodiment of the last low frequency generator circuit utilized in the clock recovery circuit of the present invention.

The LLF signal is derived by the last low frequency generator 3 and will be described in conjunction with FIGS. 2 and 3. The last low frequency generator 3 combines the BSD and $\overline{BSD}$ signals with the QBT and TQBT signals and their complement signals simultaneously while the recovered clock RF is a logic one (high). The last low frequency generator 3 of the preferred embodiment is shown in FIG. 2. An LLF latch 31 is set and reset in accordance with the following equations:

$$LLF = RFx/\cdot(BSD\cdot QBT\cdot TQBT)$$

$$\overline{LLF} = RFx/\cdot(\overline{BSD}\cdot\overline{QBT}\cdot\overline{TQBT})$$

When the signals BSD, QBT are a logic one (high), and RFx/ is a logic zero (low), the output of NOR-gate 32 is a logic zero (or low). Inverter 33 will invert the output of NOR-gate 32 resulting in a logic one input to NOR-gate 34. When the TQBT signal is low, the output of NOR-gate 34 is low, the LLF latch 31 being reset, i.e. LLF=0, due to LLF/ being high. At the same time, the $\overline{QBT}$ and $\overline{BSD}$ inputs to NOR-gate 36 are low, the RFx/ signal still is low, which results in the output of NOR-gate 36 being a logic one; hence, the output of inverter 37 and the input to NOR-gate 38 is low. Since TQBT is low, $\overline{TQBT}$ is high, yielding a low output from NOR-gate 38. This condition is shown in FIG. 3 just prior to time T$_1$. At time T$_1$, TQBT goes high and $\overline{TQBT}$ goes low. This results in the output of NOR-gate 38 going high, causing LLF/ to go low and LLF to go high, thereby setting LLF latch 31. As can be seen from the above condition, NOR-gates 32 and 34 together with inverter 33 yield the resultant AND function for the TQBT, QBT and BSD signals for setting LLF latch 31, and NOR-gates 36 and 38 together with inverter 37 give the AND function for the $\overline{TQBT}$, $\overline{QBT}$, and $\overline{BSD}$ signals for resetting the LLF latch 31. The setting and resetting of LLF latch 31 is performed in accordance with the above equations, the conditions being satisfied at discrete times T$_1$ through T$_6$ as shown in FIG. 3.

Figure 3:
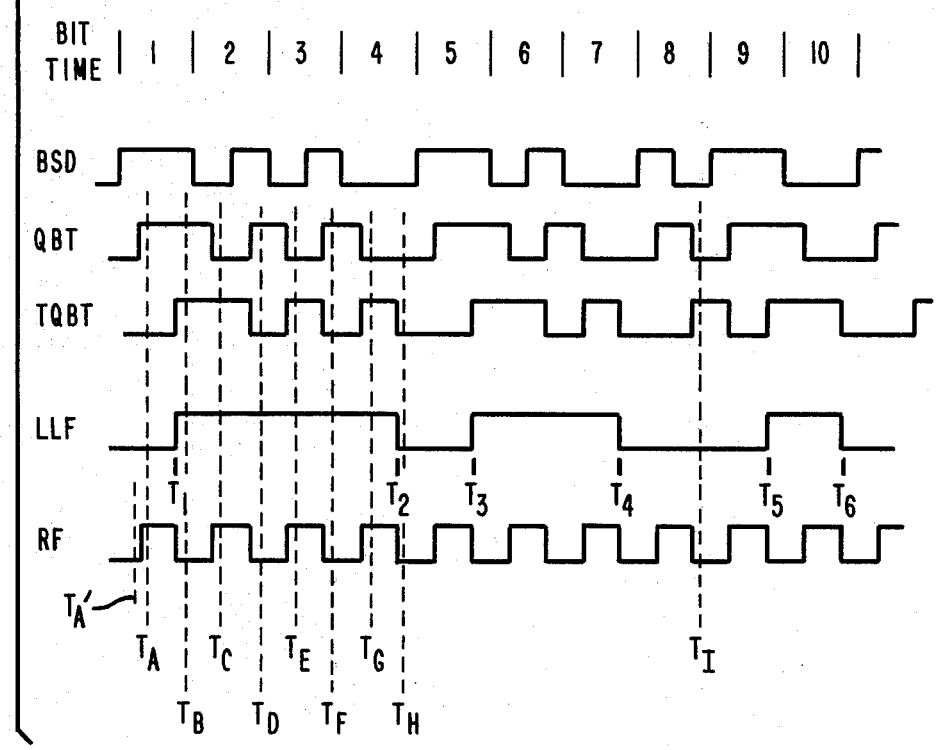
FIG. 3 is a timing diagram of specified signals inputted to, and generated by, the clock recovery circuit of the present invention.

An examination of the waveforms of FIG. 3 shows the BSD waveform having a low frequency during bit times 1, 4, 5, 7, 9 and 10. A low frequency is said to occur when, at the three-quarter bit time mark, no change of state of the BSD signal has occurred during that bit time period. LLF transitions therefore occur during the corresponding bit times. This is shown by the LLF waveform at times T$_1$, T$_2$, T$_3$, T$_4$, T$_5$, and T$_6$ and is consistent with the above equations. Every change in the state of LLF indicates a low frequency of the data has occurred in the current bit time, the LLF signal making a transition at the three-quarter point within the bit time.

Figure 4:
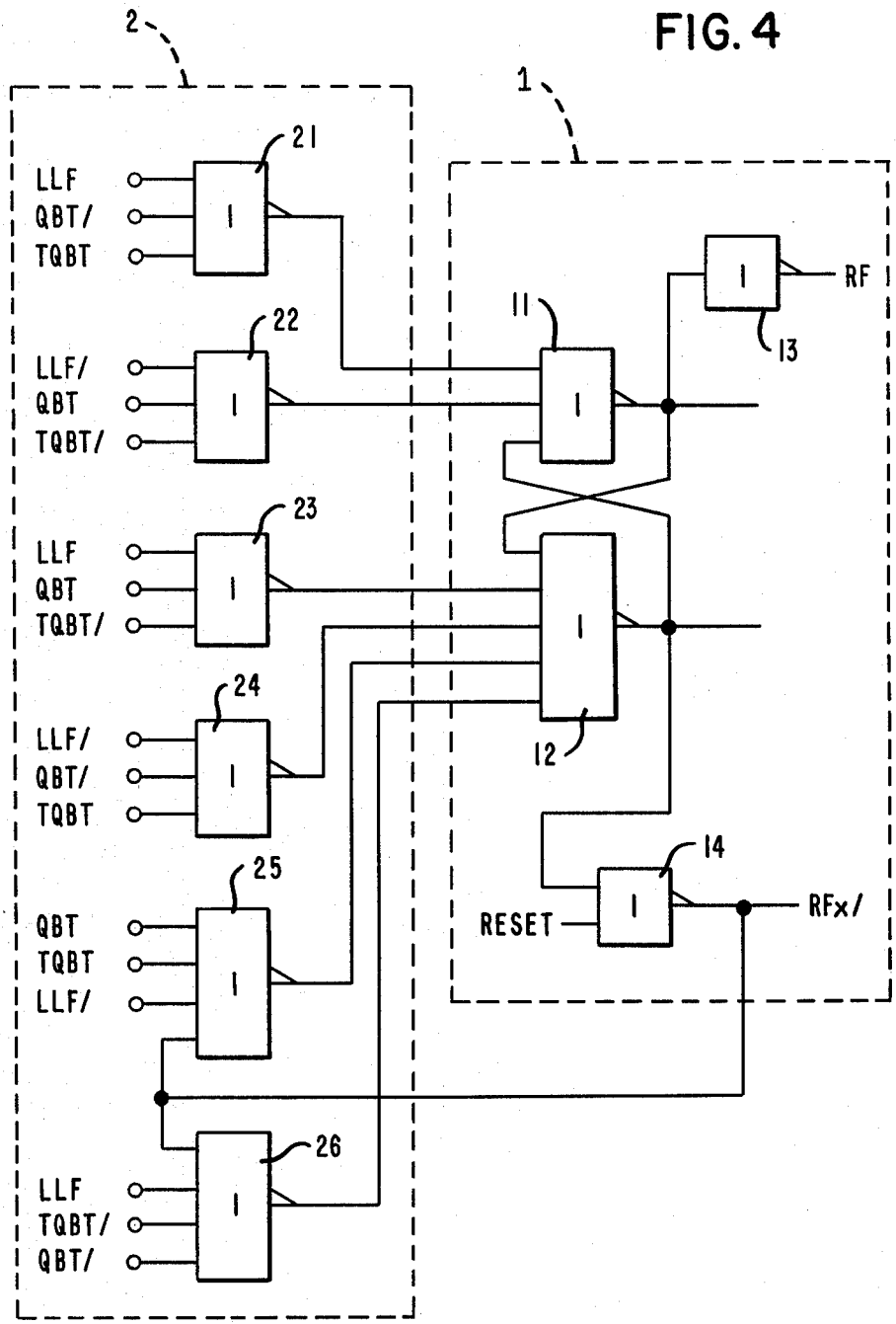
FIG. 4 is a logic diagram of the preferred embodiment of the latch triggering logic and latch circuits.

The latch 1 and latch triggering logic 2 will now be described in conjunction with FIGS. 3 and 4. The latch 1 and latch triggering logic 2 of the preferred embodiment is shown in FIG. 4. The latch 1 is an R-S latch comprised of NOR-gates 11 and 12 in a cross-coupled configuration. The output of NOR-gate 11 is inverted by inverter 13, the output of inverter 13 being the recovered clock signal, RF. The output of NOR gate 12 is fed through a NOR-gate 14, the output of NOR-gate 14 being the inverted recovery clock signal RFx/, the x denoting a slight delay from the RF clock signal. The RESET input to NOR-gate 14 is low in normal operation, (a logic zero), thereby enabling NOR-gate 14 for the normal clock recovery function.

The latch triggering logic 2 is comprised of NOR-gate 21 through NOR-gate 26. The outputs of NOR-gates 21, 22 are coupled to the inputs of NOR-gate 11 for providing a set signal of latch 1. The output of NOR-gates 23, 24, 25, 26 are coupled to NOR-gate 12 for providing a reset signal for latch 1. The latch 1 is set and reset by the combined LLF, QBT and TQBT signals and their inverted signals by NOR-gate 21 through NOR-gate 24. A change of state in the LLF signal while RF is high forces RF low. This function is accomplished by NOR-gates 25, 26.

The setting and resetting of latch 1 is performed by the NOR-gate 21 through NOR-gate 26 in accordance with the equations set forth in Table 1.

TABLE 1

| | EQUATION | TIME OCCURRENCE SHOWN IN FIG. 3 |
|---|---|---|
| 1. | $RF = QBT \cdot \overline{TQBT} \cdot \overline{LLF}$ | $T_A$ |
| 2. | $RF = \overline{QBT} \cdot TQBT \cdot LLF$ | $T_C, T_E, T_G$ |
| 3. | $\overline{RF} = \overline{LLF} \cdot TQBT \cdot \overline{QBT}$ | $T_I$ |
| 4. | $\overline{RF} = LLF \cdot \overline{TQBT} \cdot QBT$ | $T_D, T_F$ |
| 5. | $\overline{RF} = LLF \cdot \overline{TQBT} \cdot \overline{QBT}$ | $T_H$ |
| 6. | $\overline{RF} = \overline{LLF} \cdot TQBT \cdot QBT$ | $T_B$ |

Table 1 correlates all the combinations of the set-reset conditions with a time occurrence $T_A$ through $T_I$ shown in FIG. 3. For example, equation 1 in Table 1 specifies the RF signal will be high (i.e., the latch 1 will be set) when QBT is high, and TQBT and LLF are low. Referring to FIG. 3, just prior in time to $T_A$ at time $T_A'$, QBT, TQBT, and LLF are low, yielding RF low. At time $T_A$, QBT has gone high resulting in RF going high. Examination of the waveforms of FIG. 3 can be similarly performed to correlate the condition of the signals at times $T_B$ through $T_I$ with the equations of Table 1. Further, the set-reset of latch 1 for times not specifically delineated between times $T_H$ and $T_I$ can be correlated to one of the equations of Table 1.

By further examination of the waveforms of FIG. 3, it will be obvious to one skilled in the art that due to the quarter bit time and three-quarter bit time delay utilized in the generation of the recovered clock signal by the present invention, the maximum amount of bit distortion allowable in the serial digital data input is in a range of +25% to -25% of a bit time. Although the above discussion is specifically directed to Manchester encoded data, it will be recognized by those skilled in the art that the circuit of the present invention is applicable to double frequency encoded data streams, including Manchester and diphase encoded data streams.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

I claim:

1. A clock recovery circuit, having an input terminal adapted to receive a serial data stream having a defined bit time, said serial data stream being the resultant combination of a data signal and a clock signal, said clock recovery circuit comprising:
   (a) means for deriving a shaped serial data stream from said serial data stream thereby providing a first input signal;
   (b) first means for shifting said first input signal by one-quarter bit time thereby providing a second input signal;
   (c) second means for shifting said first input signal by three-quarters of a bit time thereby providing a third input signal;
   (d) a latch, having an output terminal for providing an output signal; and
   (e) means for operating said latch, said means for operating having a first, second, and third input terminal adapted to receive said first, second, and third input signal, respectively, and further having a fourth, fifth, and sixth input terminal adapted to receive the respective complement signals of the first, second, and third input signals, wherein the respective complement signals are symmetrical in time, said means for operating operatively connected to said first, second, third, fourth, fifth, and sixth input terminals and to said latch, said means for operating generating a trigger signal upon detection of a transition in the second input signal and in the third input signal, thereby causing a transition in the output signal of said latch, said output signal being the clock signal recovered from said serial data stream.

2. A clock recovery circuit according to claim 1, wherein said means for operating comprises:
   (a) means for generating a first signal, said means for generating a first signal operatively connected to said first, second, third, fourth, fifth, and sixth input terminals, and operatively connected to said latch, said first signal indicating whether a low frequency of the first input signal has occurred during the bit time just about to expire; and
   (b) means for triggering said latch, said means for triggering operatively connected to said second, third, fifth, and sixth input terminals, to said latch, and to said means for generating a first signal, said means for triggering combining said second input signal, said third input signal, said first signal, their respective complement signals, and said output signal, for generating setting and resetting signals of said latch, the output signal of said latch being the clock signal.

3. A clock recovery circuit according to claim 2, wherein said means for generating comprises:
   (a) a first signal latch having a first signal output terminal; and
   (b) a first plurality of NOR-gates, operatively connected to said first signal latch, combining said first, second, and third input signals, their respective complement signals, and said output signal, for generating setting and resetting signals of said first signal latch, thereby causing said first signal latch to provide said first signal at the first signal output terminal.

4. A clock recovery circuit according to claim 3, wherein the first plurality of NOR-gates comprises:
   (a) a first and second inverter, each inverter having an input and an output;
   (b) a first and second NOR-gate, said first NOR-gate having a first, second, and third input, and an output, and said second NOR-gate having a first and second input, and an output, the first input of said first NOR-gate adapted to receive said first input signal, the second input of said first NOR-gate adapted to receive said second input signal, the third input of said first NOR-gate adapted to receive said output signal, the output of said first NOR-gate operatively connected to the input of said first inverter, the output of said first inverter operatively connected to the second input of said second NOR-gate, the first input of said second NOR-gate adapted to receive said third input signal, and the output of said second NOR-gate operatively connected to the first signal latch;
and (c) a third and fourth NOR-gate, said third NOR-gate having a first, second, and third input, and an output, and said fourth NOR-gate having a first and second input, and an output, the first input of said third NOR-gate adapted to receive said output signal, the second input of said third NOR-gate adapted to receive the complement of the second input signal, the third input of said third NOR-gate adapted to receive the complement of said first input signal, the output of said third NOR-gate operatively connected to the input of said second inverter, the output of said inverter operatively connected to the first input of said fourth NOR-gate, the second input of said fourth NOR-gate adapted to receive the complement of said third input signal, and the output of said fourth NOR-gate operatively connected to said first signal latch.

5. A clock recovery circuit according to claim 4, wherein the means for triggering comprises:

(a) a fifth NOR-gate having a first, second, and third input and an output, the first input of said fifth NOR-gate adapted to receive said first signal, the second input of said fifth NOR-gate adapted to receive the complement of said second input signal, the third input of said fifth NOR-gate adapted to receive said third input signal, and the output of said fifth NOR-gate operatively connected to said latch;

(b) a sixth NOR-gate having a first, second, and third input and an output, the first input of said sixth NOR-gate adapted to receive a complement of said first signal, the second input of said sixth NOR-gate adapted to receive said second input signal, the third input of said sixth NOR-gate adapted to receive the complement of said third input signal, and the output of said sixth NOR-gate operatively connected to said latch;

(c) a seventh NOR-gate having a first, second, and third input and an output, the first input of said seventh NOR-gate adapted to receive said first signal, the second input of said seventh NOR-gate adapted to receive said second input signal, the third input of said seventh NOR-gate adapted to receive the complement of said third input signal, and the output of said seventh NOR-gate operatively connected to said latch;

(d) an eighth NOR-gate having a first, second, and third input and an output, the first input of said eighth NOR-gate adapted to receive the complement of said first signal, the second input of said eighth NOR-gate adapted to receive the complement of said second input signal, the third input of said eighth NOR-gate adapted to receive said third input signal, and the output of said eighth NOR-gate operatively connected to said latch;

(e) a ninth NOR-gate having a first, second, third and fourth input and an output, the first input of said ninth NOR-gate adapted to receive said second input signal, the second input of said ninth NOR-gate adapted to receive said third input signal, the third input of said ninth NOR-gate adapted to receive the complement of said first signal, the fourth input of said ninth NOR-gate adapted to receive said output signal, and the output of said ninth NOR-gate operatively connected to said latch; and (f) a tenth NOR-gate having a first, second, third, and fourth input and an output, the first input of said tenth NOR-gate adapted to receive said output signal, the second input of said tenth NOR-gate adapted to receive said first signal, the third input of said tenth NOR-gate adapted to receive the complement of said third input signal, the fourth input of said tenth NOR-gate adapted to receive the complement of said second input signal, and the output of said tenth NOR-gate operatively connected to said latch.

6. A clock recovery circuit according to claim 5, wherein said latch comprises:

(a) an eleventh NOR-gate having a first, second, and third input and an output; and (b) a twelfth NOR-gate having a first, second, third, fourth and fifth input and an output, the eleventh and twelfth NOR-gates being cross-coupled such that the output of the eleventh NOR-gate is coupled to the first input of said twelfth NOR-gate and the output of the twelfth NOR-gate is coupled to the third input of said eleventh NOR-gate, the first and second input of said eleventh NOR-gate being operatively connected to the output of the fifth and sixth NOR-gate respectively, thereby providing a setting signal for said latch, and the second, third, fourth, and fifth input of said twelfth NOR-gate being operatively connected to the output of the seventh, eighth, ninth and tenth NOR-gates respectively, thereby providing a resetting signal for said latch.

7. A clock recovery circuit according to claim 6, wherein the first signal latch comprises:

(a) a thirteenth NOR-gate having a first and second input and an output; and (b) a fourteenth NOR-gate having a first and second input and an output, the thirteenth and fourteenth NOR-gates being cross-coupled such that the output of the thirteenth NOR-gate is coupled to the first input of the fourteenth NOR-gate and the output of the fourteenth NOR-gate is coupled to the second input of the thirteenth NOR-gate, the first input of said thirteenth NOR-gate being operatively connected to the output of said second NOR-gate, and the second input of said fourteenth NOR-gate being operatively connected to said fourth NOR-gate, the output of said thirteenth NOR-gate being coupled to the first signal output terminal thereby providing said first signal to the first signal output terminal, and the output of said fourteenth NOR-gate providing the complement of said first signal.

8. A clock recovery circuit, having an input terminal adapted to receive a serial data stream having a defined bit time, said serial data stream being the resultant combination of a data signal and a double bit rate clock signal, said clock recovery circuit comprising:

(a) means for deriving a shaped serial data stream from said serial data stream thereby providing a first input signal;

(b) first means for shifting said first input signal by one-quarter bit time thereby providing a second input signal;

(c) second means for shifting said first input signal by three-quarters of a bit time, thereby providing a third input signal;

(d) a latch, having an output terminal for providing an output signal; and (e) means for operating said latch, said means for operating having a first, second, and third input terminal adapted to receive said first, second, and third input signal, respectively, and further having a fourth, fifth, and sixth input terminal adapted to receive the respective complement signals of the first, second, and third input signals, wherein the respective complement signals are symmetrical in time, said means for operating operatively connected to said first, second, third, fourth, fifth, and sixth input terminals and to said latch, said means for operating generating a trigger signal upon detection of a transition in the second input signal and in the third input signal, thereby causing a transition in the output signal of said latch, said output signal being the double bit rate clock signal recovered from said serial data stream.

9. A clock recovery circuit according to claim 8, wherein said means for operating comprises:
(a) means for generating a first signal, said means for generating a first signal operatively connected to said first, second, third, fourth, fifth, and sixth input terminals, and operatively connected to said latch, said first signal indicating whether a low frequency of the first input signal has occurred during the bit time just about to expire; and
(b) means for triggering said latch, said means for triggering operatively connected to said second, third, fifth, and sixth input terminals, to said latch, and to said means for generating a first signal, said means for triggering combining said second input signal, said third input signal, said first signal, their respective complement signals, and said output signal, for generating setting and resetting signals of said latch, the output signal of said latch being the double bit rate clock signal.

10. A clock recovery circuit according to claim 9, wherein said means for generating comprises:
(a) a first signal latch having a first signal output terminal; and
(b) a first plurality of NOR-gates, operatively connected to said first signal latch, combining said first, second, and third input signals, their respective complement signals, and said output signal, for generating setting and resetting signals of said first signal latch, thereby causing said first signal latch to provide said first signal at the first signal output terminal.

11. A clock recovery circuit according to claim 10, wherein the first plurality of NOR-gates comprises:
(a) a first and second inverter, each inverter having an input and an output;
(b) a first and second NOR-gate, said first NOR-gate having a first, second, and third input, and an output, and said second NOR-gate having a first and second input, and an output, the first input of said first NOR-gate adapted to receive said first input signal, the second input of said first NOR-gate adapted to receive said second input signal, the third input of said first NOR-gate adapted to receive said output signal, the output of said first NOR-gate operatively connected to the input of said first inverter, the output of said first inverter operatively connected to the second input of said second NOR-gate, the first input of said second NOR-gate adapted to receive said third input signal, and the output of said second NOR-gate operatively connected to the first signal latch; and
(c) a third and fourth NOR-gate, said third NOR-gate having a first, second, and third input, and an output, and said fourth NOR-gate having a first and second input, and an output, the first input of said third NOR-gate adapted to receive said output signal, the second input of said third NOR-gate adapted to receive the complement of the second input signal, the third input of said third NOR-gate adapted to receive the complement of said first input signal, the output of said third NOR-gate operatively connected to the input of said second inverter, the output of said inverter operatively connected to the first input of said fourth NOR-gate, the second input of said fourth NOR-gate adapted to receive the complement of said third input signal, and the output of said fourth NOR-gate operatively connected to said first signal latch.

12. A clock recovery circuit according to claim 11, wherein the means for triggering comprises:
(a) a fifth NOR-gate having a first, second, and third input and an output, the first input of said fifth NOR-gate adapted to receive said first signal, the second input of said fifth NOR-gate adapted to receive the complement of said second input signal, the third input of said fifth NOR-gate adapted to receive said third input signal, and the output of said fifth NOR-gate operatively connected to said latch;
(b) a sixth NOR-gate having a first, second, and third input and an output, the first input of said sixth NOR-gate adapted to receive a complement of said first signal, the second input of said sixth NOR-gate adapted to receive said second input signal, the third input of said sixth NOR-gate adapted to receive the complement of said third input signal, and the output of said sixth NOR-gate operatively connected to said latch;
(c) a seventh NOR-gate having a first, second, and third input and an output, the first input of said seventh NOR-gate adapted to receive said first signal, the second input of said seventh NOR-gate adapted to receive said second input signal, the third input of said seventh NOR-gate adapted to receive the complement of said third input signal, and the output of said seventh NOR-gate operatively connected to said latch;
(d) an eighth NOR-gate having a first, second, and third input and an output, the first input of said eighth NOR-gate adapted to receive the complement of said first signal, the second input of said eighth NOR-gate adapted to receive the complement of said second input signal, the third input of said eighth NOR-gate adapted to receive said third input signal, and the output of said eighth NOR-gate operativey connected to said latch;
(e) a ninth NOR-gate having a first, second, third and fourth input and an output, the first input of said ninth NOR-gate adapted to receive said second input signal, the second input of said ninth NOR-gate adapted to receive said third input signal, the third input of said ninth NOR-gate adapted to receive the complement of said first signal, the fourth input of said ninth NOR-gate adapted to receive said output signal, and the output of said ninth NOR-gate operatively connected to said latch; and
(f) a tenth NOR-gate having a first, second, third, and fourth input and an output, the first input of said tenth NOR-gate adapted to receive said output signal, the second input of said tenth NOR-gate adapted to receive said first signal, the third input of said tenth NOR-gate adapted to receive the complement of said third input signal, the fourth input of said tenth NOR-gate adapted to receive the complement of said second input signal, and the output of said tenth NOR-gate operatively connected to said latch.

13. A clock recovery circuit according to claim 12, wherein said latch comprises:
   (a) an eleventh NOR-gate having a first, second, and third input and an output; and
   (b) a twelfth NOR-gate having a first, second, third, fourth, and fifth input and an output, the eleventh and twelfth NOR-gates being cross-coupled such that the output of the eleventh NOR-gate is coupled to the first input of said twelfth NOR-gate and the output of the twelfth NOR-gate is coupled to the third input of said eleventh NOR-gate, the first and second input of said eleventh NOR-gate being operatively connected to the output of the fifth and sixth NOR-gate respectively, thereby providing a setting signal for said latch, and the second, third, fourth, and fifth input of said twelfth NOR-gate being operatively connected to the output of the seventh, eighth, ninth and tenth NOR-gates respectively, thereby providing a resetting signal for said latch.

14. A clock recovery circuit according to claim 13, wherein the first signal latch comprises:
   (a) a thirteenth NOR-gate having a first and second input and an output; and
   (b) a fourteenth NOR-gate having a first and second input and an output, the thirteenth and fourteenth NOR-gates being cross-coupled such that the output of the thirteenth NOR-gate is coupled to the first input of the fourteenth NOR-gate and the output of the fourteenth NOR-gate is coupled to the second input of the thirteenth NOR-gate, the first input of said thirteenth NOR-gate being operatively connected to the output of said second NOR-gate, and the second input of said fourteenth NOR-gate being operatively connected to said fourth NOR-gate, the output of said thirteenth NOR-gate being coupled to the first signal output terminal thereby providing said first signal to the first signal output terminal, and the output of said fourteenth NOR-gate providing the complement of said first signal.

* * * * *